Jan. 13, 1959 P. H. HARRER 2,868,113
AUTOMATIC BELT CLUTCH FOR CONVEYER DRIVE
Filed Nov. 16, 1954 3 Sheets-Sheet 1

Inventor
Paul H. Harrer
By
Attorney

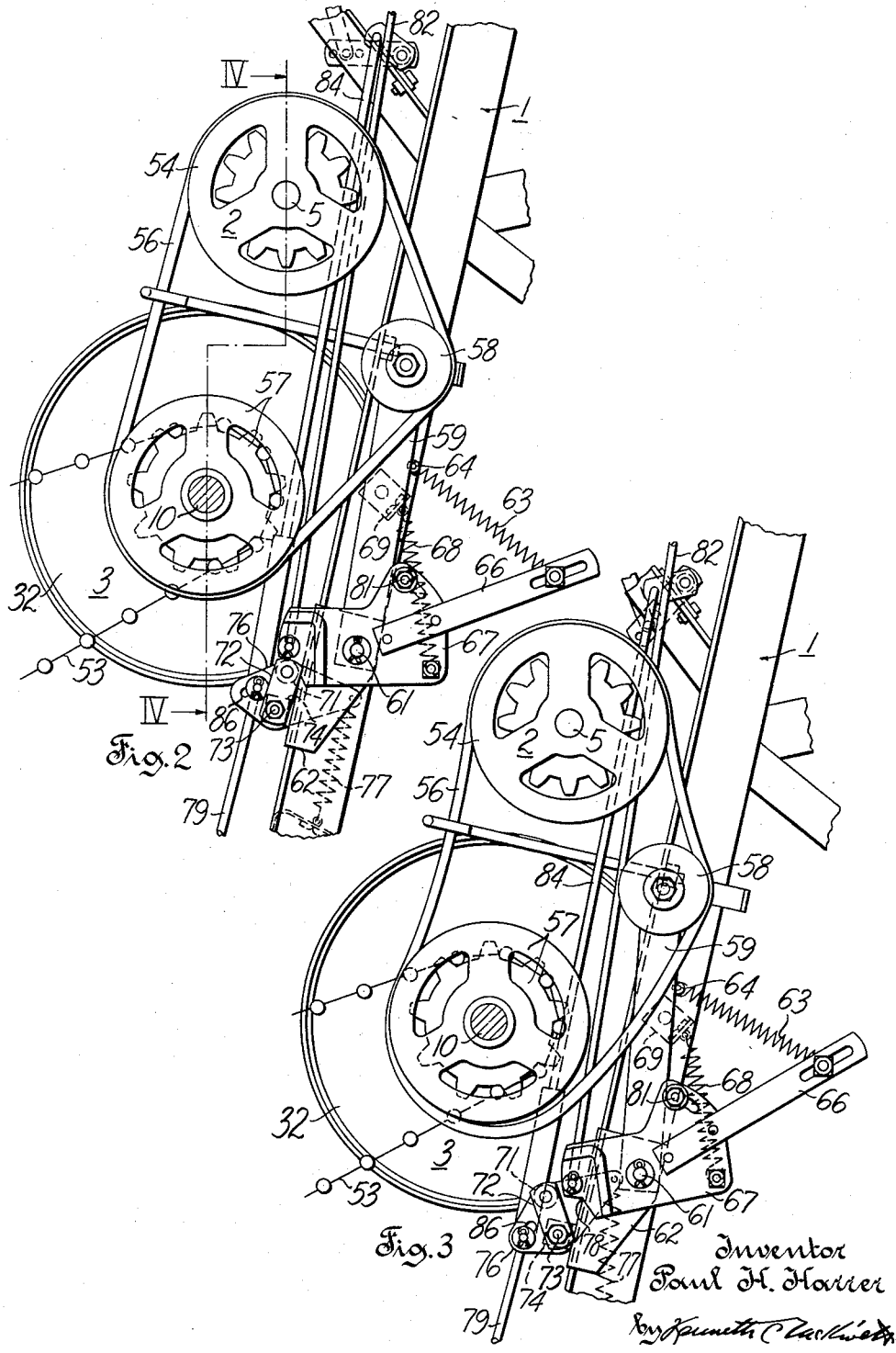

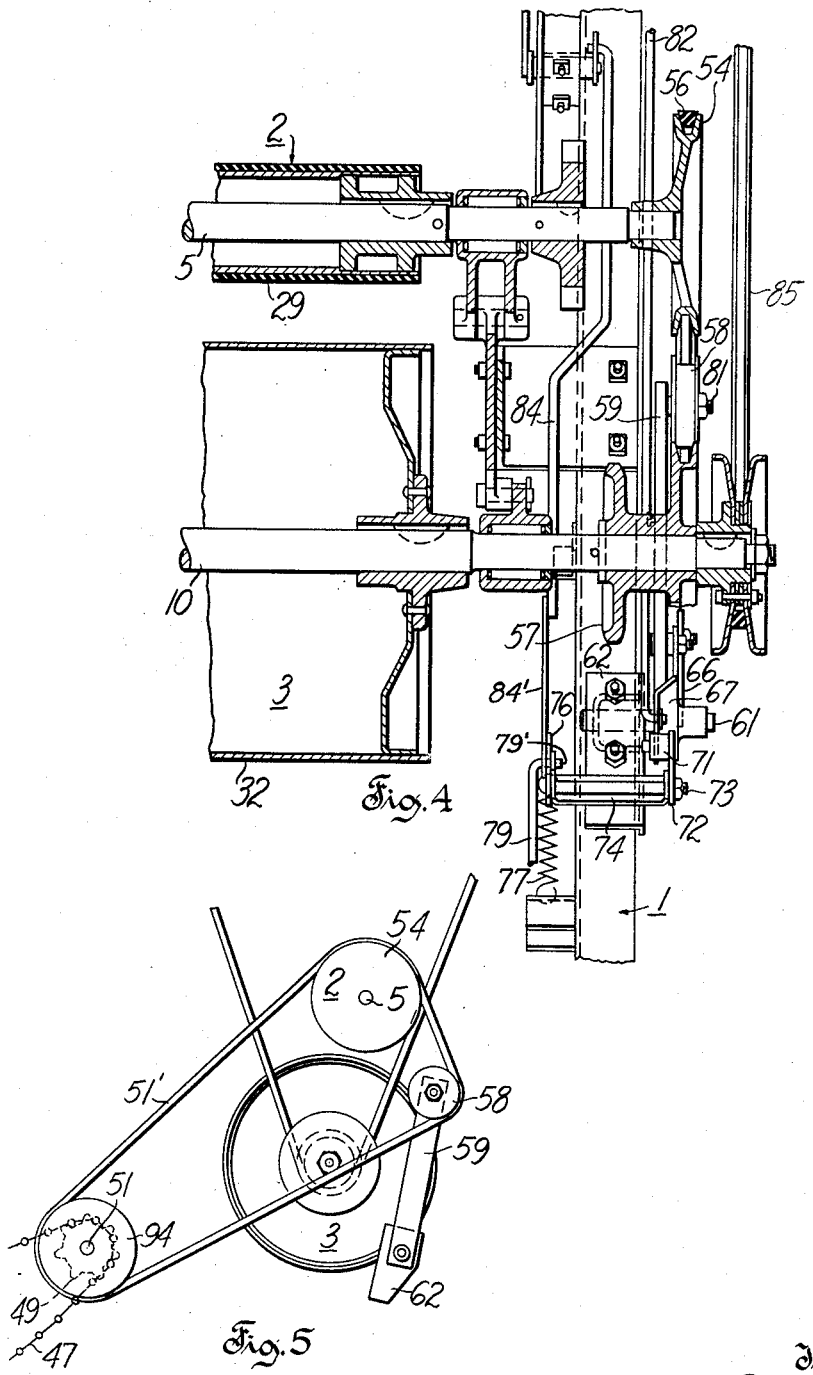

2,868,113

AUTOMATIC BELT CLUTCH FOR CONVEYER DRIVE

Paul H. Harrer, La Porte, Ind., assignor to Allis-Chalmers Manufacturing Company, Milwaukee, Wis.

Application November 16, 1954, Serial No. 469,240

4 Claims. (Cl. 100—5)

The present invention is directed particularly toward and contemplates a rotary hay baling machine incorporating features of improvement advantageously effecting the rolling of hay or the like into a formed cylindrical bale.

This invention relates to baling machines of the type embodying means positionable to roll material delivered thereto into a formed and twine wrapped bale of predetermined diameter and positionable to discharge such bale from the machine, and a conveyer which operates to provide the bale forming means with material and which conveyer is automatically stopped during the twine wrapping and discharging operation and has for its primary object an improved clutch mechanism for controlling the operation of the conveyer.

A further object of this invention is to provide a torque limiting clutch in the conveyer drive of a baling machine.

Another object of this invention is to provide a conveyer clutch in a baling machine which is free of abruptness and attendant shock and yet which is positive acting.

Another object of this invention is to provide an improved clutch in a baler and which clutch is easily manufactured and therefore economical to produce.

The significance of the hereinabove stated objects and the manner in which they may be readily accomplished in whole or in part will become apparent as the disclosure progresses and particularly points out additional objects, advantages and features which are considered of special importance and of general application although they are herein shown and described as applied to the type of machine disclosed in C. J. Scranton et al., U. S. 2,468,641 and P. H. Harrer, U. S. 2,424,821 issued April 26, 1949 and July 29, 1947, respectively.

Accordingly, the invention may be considered as consisting of the various features of construction, correlation of elements, arrangements of parts as more fully set forth in the appended claims and disclosed in the following detailed description; reference being had to the accompanying drawings in which:

Fig. 2 is an enlarged fragmentary side view of a portion of the machine shown in Fig. 1, with the header conveyer operating;

Fig. 3 is an enlarged fragmentary side view of a portion of the machine shown in Fig. 1, with the header conveyer stopped;

Fig. 4 is an enlarged sectional view taken on the line IV—IV of Fig. 2; and

Fig. 5 is a view similar to Fig. 2 showing a different embodiment of the invention.

Figure 1:
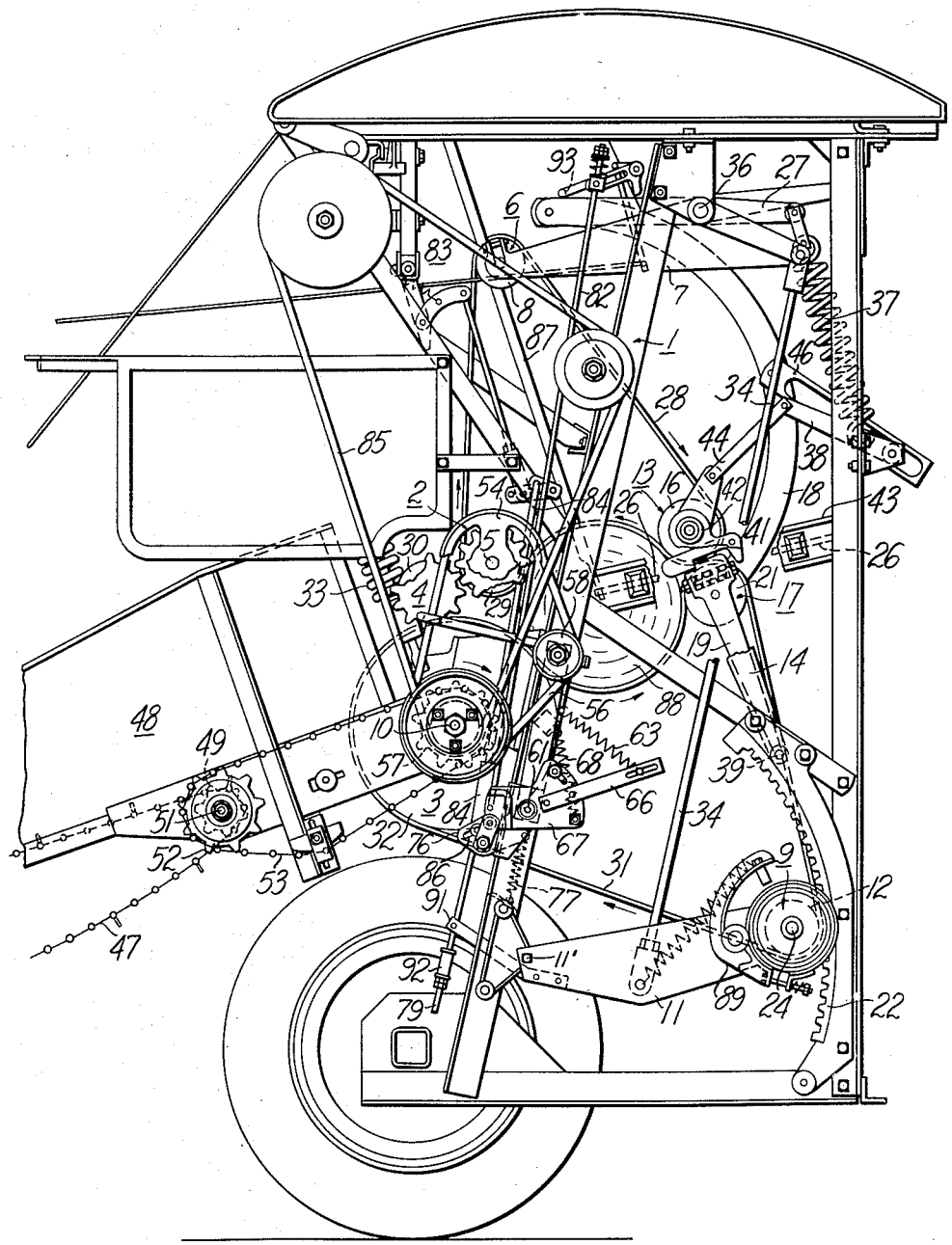
Fig. 1 is a side view of a rotary baling machine embodying the invention, with parts broken away and wherein the machine has partially formed a bale.

Referring to Fig. 1 of the accompanying drawings, it is seen that the invention may be applied to a wheel supported baling machine including a frame structure 1 operatively mounting a bale forming means including an upper drive roll assembly 2; a lower drive roll assembly 3; a press roll assembly 4; an upper tension roll assembly 6 including pivotally supported tension arms 7 (only one of which is shown) rotatably mounting a roll 8; a lower tension roll assembly 9 including pivotally supported tension arms 11 (only one of which is shown) rotatably mounting a roll 12; an upper trip roll assembly 13 including an arm 14 rotatably supporting a roll 16; a lower trip roll assembly 17 including a hanger or bow member 18 supported at its lower end on arm 19 which in turn rotatably mounts a roll 21; arcuate racks 22 (only one of which is shown) which are engaged with pinions (not shown) carried by the adjacent end of lower tension shaft 24; a pivoted latch release bar 26; and a discharge rocker arm 27.

The bale forming means also includes one or more endless bale forming bands or belts 28 mounted for movement over the roll portion 29 of drive roll assembly 2, over the roll 8 of the upper tension roll assembly 6, and over the roll 16 of the upper trip roll assembly 13. Also one or more endless bale forming bands or belts 31 are mounted for movement over the roll portion 32 of drive roll assembly 3, over the roll 12 of the lower tension roll assembly 9, and over the roll 21 of the lower trip roll assembly 17; the belts being driven in the same directions by the roll portions 29 and 32 of the drive roll assemblies 2 and 3, respectively, so that the opposed adjacent portions of belts 28 and 31 are moving in opposite directions as shown by arrows in Fig. 1. Drive roll assemblies 2 and 3 are provided with central drive shafts 5 and 10, respectively, which are driven in the same direction by conventional means not shown. Press roll assembly 4 is preferably gear driven by the upper drive roll assembly 2 and the roll portion 30 of assembly 4 is preferably urged toward roll portion 32 of lower drive roll assembly 3 by means of one or more springs 33.

The upper and lower tension arms 7 and 11 are swingably interconnected for simultaneous angular movement by means of a rod 34, and the upper tension arms 7 and discharge rocker arm 27 are mounted for relative pivotal movement about a common fulcrum 36, arm 7 being biased by a spring (not shown) for clockwise movement about fulcrum 36, and counterclockwise movement of arm 27 being resiliently restrained by means of a spring 37 having one end connected with one arm of a bell crank lever 38 and having its other end connected with the adjacent end of arm 27. Trip roll arms 14 and 19 are pivotally interconnected at 39 for relative angular movement and are normally retained locked in the aligned position shown by means of a releasable latch 41 carried by arm 14 in a position to engage the top portion of arm 19. Arm 14 also has mounted thereon a flanged wheel 42 adapted to engage and roll along the top surface of an inclined frame member 43 which mounts the latch bar 26; this arm and wheel being normally supported for coaction with the top surface of member 43 by means of a link 44 connecting the upper end of arm 14 with an arm of bell crank lever 38. Movement of bow member 18 toward the lower drive roll assembly 3 is limited by a loop link 46 connected as shown. Material to be baled is delivered to a point adjacent roll portions 30 and 32 of press roll assembly 4 and lower drive roll assembly 3, respectively, by means of an endless conveyer 47 which is operatively mounted to operate over the floor of a header 48 pivotally attached at its upper end to frame 1. The upper end of conveyor 47 includes a shaft 51 rotatably supported in header 48 and this shaft has sprockets 49 and 52 pinned thereto. Sprocket 52 is driven by means of chain 53 and sprocket 49 drives conveyer 47.

The various parts thus far described are constructed and correlated to operate in substantially the same manner as the corresponding parts of the previously identified Scranton et al. and Harrer patents and reference may be had to these patented disclosures if greater details of construction are desired.

Referring to Figs. 1 and 2, it is seen that a driving sheave 54 is mounted on and pinned to the upper drive roll shaft 5 for rotation therewith. The driving connection from sheave 54 to sprocket 52 includes a driven sheave and sprocket 57 rotatably mounted on shaft 10 of the lower feed roll assembly 3, a V-belt 56 which is operable, as will be explained hereinbelow, to selectively establish and interrupt a power transmitting connection between the sheaves 54 and 57, and a chain 53 operatively connecting sprockets 57 and 52.

The endless belt 56 is trained about the driving and driven sheaves 54 and 57, and the belt is of a length greater than the minimum length required to operatively engage it in power transmitting relation with the sheaves 54 and 57. In other words, the belt 56 is appreciably longer than one which would normally be called for by the chosen sheave diameters and center distance and which, if placed around the sheaves, would have sufficient inherent tension without the aid of a tensioning roller or the like, to effectively transmit power from one sheave to the other. Due to its abnormal length, the belt 56 may assume a slack condition, as illustrated by Fig. 3, and tensioning means for the belt include a thrust transmitting element in the form of an idler sheave 58 which is adjustable relative to the shafts 5 and 10 so as to establish a power transmitting connection between the sheaves 54 and 57 by adjustment of the idler sheave 58 in a belt tightening direction, and so as to interrupt said power transmitting connection by adjustment of the idler sheave 58 in belt slacking direction.

The slack side of belt 56 is tensioned by idler sheave 58 rotatably mounted on and adjacent one end of arm 59 which has its other end secured to a pin 61 (see Fig. 4) pivotally mounted in a bracket 62 attached to bailer frame 1. Arm 59 is biased for clockwise pivotal movement (as viewed in Figs. 2 and 3) by a spring 63 one end of which is attached to arm 59 through a pin 64 and the other end of spring 63 is adjustably attached to a strap 66 as by bolting. Strap 66 is attached to latch plate 67 which is pivotally mounted on pin 61. Latch plate 67 is biased for counterclockwise pivotal movement by a spring 68 connected at one end thereto and connected at its other end to bracket 69 on bailer frame 1. Such pivotal movement of latch plate 67 is restrained by roller 71 rotatably attached to one end of an element 72, the other end of element 72 is attached to one end of a pin 73 which is pivotally mounted in a bracket 74 carried by bailer frame 1. An arm 76 is attached to the other end of pin 73 for movement therewith and is biased against counterclockwise rotation by a spring 77 carried by bailer frame 1 so that roller 71 is held in abutting relation to a notch 78 (more clearly shown in Fig. 3) in plate 67. When a downward pull is exerted on link 79 which has a bent over portion 79' (Fig. 4) at its upper end hooked into a slot 86 (Fig. 2) at a radial distance from the axis of pin 73, the arm 76, pin 73, element 72 and roller 71 are rocked counterclockwise as a unit so that the roller 71 moves away from its relation with latch plate 67. Plate 67, then in turn pivots counterclockwise because of the pull of 68, and after a small amount of such pivotal movement, a stop member 81 carried by plate 67 abuts arm 59 so that it also pivots about pin 61 in a counterclockwise direction.

As soon as arm 59 and pulley 58 attached to it move in a counterclockwise direction, the tension on belt 56 is released and the driving connection to sprocket 52 (Fig. 1) is broken. The driving connection is reinstated by an upward pull on link 82 which is pivotally connected to plate 67 to the left of its pivot pin 61 so that an upward pull causes the plate and arm 59 to pivot in a clockwise direction to a position as originally shown in Figs. 1 and 2. It is seen that idler pulley 58 and its connected mechanism provides a torque limiting clutch because if the load on conveyer 47 becomes excessive sheave 54 will rotate without driving belt 56 or conveyor 47.

The baling machine is also provided with an automatic twine wrapping mechanism indicated generally by reference numeral 83 (Fig. 1) which is drivenly connected to shaft 10 by conventional means including V-belt 85. This twine wrapping mechanism is actuated by a link 84 pivotally connected at its lower end to the upper end of rod 79, the lower part of the link 84 being formed by a length of strap iron 84' as best shown in Fig. 4 and a bent over upper end 79' of the link 79 which extends into the slot 86 (Figs. 2 and 3) of the arm 76 being passed through a circular, closely fitting hole in the lower end of the strap 84'. A downward pull on link 84 actuates the twine wrapping mechanism. Further details of the twine wrapping mechanism are not here included as they are the same as disclosed in the previously mentioned Scranton et al. and Harrer patents, except to point out that the twine wrapping mechanism 83 is provided with a bale discharge actuating rod 87 which is connected at the lower end thereof to latch release bar 26 for ejecting wrapped bales from the machine.

Operation

The rotary baler machine is rolled through a field by means of a tractor (not shown). A power shaft (not shown) transmits power from the tractor simultaneously to both shafts 5 and 10 of the rotary baling mechanism and driving power for the conveyer 47 and for the twine wrapping mechanism 83 is derived from the shafts 5 and 10, respectively. The conveyer 47 moves hay rearwardly over header 48 to roll assemblies 3 and 4. At this point the hay is compressed into a mat like mass which enters into the space formed between upper baling belt 28 and lower baling belt 31. As best shown in Fig. 1 the upper baling belts are moving in a forward direction and the lower baling belts are moving in a rearward direction in the area where they are adjacently opposing each other.

Due to the movement of the belts the mat of hay starts to form a cylindrical bale 88. As the bale grows in size the upper tension roll 8 and the upper tension arm 7 are moved downwardly about the fulcrum 36, and the lower tension roll 12 and the lower tension arm 11 are moved upwardly about the fulcrum 11'. As the lower tension roll moves upwardly a braking means 89 carried by arm 11 is rotated by means of the rack 22 and the mechanism in the braking means causes tensioning of the lower baling belts 31 which in turn is transmitted to the bale and regulates the density thereof. As the upper and lower tension arms 7 and 11, respectively, are moved, a spring (not shown) is expanded and provides energy for returning these members to their normal positions when the bale is ejected.

As the bale grows in size, the hanger members 18 are pivoted counterclockwise from the position shown in Fig. 1. The lower trip roll 21 and the upper trip roll 16 are thereupon also moved toward their extreme rearward positions, the upper and lower trip arms 14 and 19 being locked together as shown in Fig. 1.

During the bale rolling operation the diameter of the bale between the upper and lower belts 28 and 31 steadily grows as long as the conveyer 47 is driven by the sheave 54, belt 56, sprocket 57 and chain 53, and feeds hay into the bale rolling mechanism. Due to the growth of the bale, the tension arm 11 moves steadily upward, and when the arm 11 approaches the limit of its up position, strap 91, attached at one end to tension arm 11 and slidably connected at the other end to rod 79, contacts stop member 92 on rod 79 and pulls downwardly on rod 79. The upper end of rod 79 is pivoted, as stated, in a hole at the lower end of link 84 and has a lost motion connection with the arm 76 by means of the slot 86. After the strap 91 has moved into contact with the stop member 92 continued growth of the bale during the final phase of the bale rolling operation causes downward movement of rod 79 and link 84 relative to the arm 76, the upper end of the rod 79 moving from the position in which it is shown in Fig. 2 toward the lower end of the slot 86. The downward lost motion of the rod 79 and link 84 afforded by the slot 86 starts the operating cycle of the wrapping mechanism 83 while the bale is still growing and the rod 79 and link 84 continue to move downward. When the upper end of rod 79 has moved to the lower end of slot 86 continued downward movement of the rod 79 causes arm 76 to pivot counterclockwise removing roller 71 from contact with the notch 78 in plate 67. Plate 67 then moves counterclockwise about the axis of pin 61 as a result of the bias of spring 68. As a result of this movement, bolt 81 carried by plate 67 contacts arm 59 and moves same counterclockwise thereby moving belt tightening sheave 58 away from belt tightening contact with belt 56. With the loss in tension in belt 56, shaft 5 continues to rotate without driving belt 56 and the motion of conveyer 47 ceases. The twine wrapping operation is completed while conveyer 47 remains idle. The return of the twine wrapping mechanism to inoperative position provides an upward pull on rod 87 which actuates trip arm 26 to eject the finished bale from the machine.

Upon ejection of the bale, bow members 18 move upwardly contacting cross member 93 causing same to move upwardly. This results in an upward movement of rod 82 which is connected at its lower end to plate 67. This upward movement of rod 82 causes plate 67 to pivot clockwise about pivot pin 61 to the position shown in Fig. 1, whereupon spring 77 pivots arm 76 and element 72 with roller 71 attached thereto to latching relation to notch 78 of plate 67. This positioning of plate 67 biases spring 63 to pivot arm 59 so that sheave 58 contacts belt 56 and tightens same to an extent that sheave 54 commences to drive integral sheave and sprocket 57 thereby commencing operation of conveyer 47 to furnish hay for forming a new bale.

From the foregoing it is seen that an automatic clutch means has been provided for a conveyer which is simple and operates without shock.

The invention is applicable in its broadest aspects to all types of rotary baling machines and it should therefore be understood that it is not intended to limit the invention to the exact construction and mode of operation herein shown and described for purposes of illustration as various modifications within the scope of the appended claims may occur to persons skilled in the art. For example, Fig. 5 shows a different form of this invention wherein a sheave 94 has been substituted for sprocket 52 on conveyer shaft 51 and a V-belt 51' drives sheave 94 directly from sheave 54 utilizing the same belt tightening clutch sheave mechanism as was previously described.

In general terms, the rod 79 and link 84 represent back and forth movable control means operatively associated with the twine wrapping mechanism 83 and with the tensioning means for the belt 56, so as to initiate operation of said wrapping mechanism and movement of the thrust transmitting element 58 in belt slackening direction by movement of the control means 79 and 84 in one direction. The tension arm 11 and associated strap 91 represent actuating means for the control means 79, 84 which actuating means are responsive to an increase of the diameter of the bale so as to effect said movement of said control means 79, 84 in said one direction after the bale has reached a predetermined diameter. The cross member 93 which is swung upwardly by the return movement of the hanger members 18 after the bale ejection, and rod 82 which extends between the cross member 93 and the latch plate 67 represent additional control means for moving the thrust transmitting element 58 of the belt tensioning means in belt tightening direction upon discharge of the bale from the bale forming mechanism by the ejecting mechanism which includes the trip roll arms 14 and 19 and the latch bar 26.

It is claimed and desired to secure by Letters Patent:

1. In a baling machine of the type wherein a mat of incoming material is rolled into a cylindrical bale and twine is wrapped around said bale before its ejection from the machine, the combination of material feeding means including a rotary drive shaft, bale forming means including a rotary drive shaft in transversely spaced relation to said drive shaft of said material feeding means, twine wrapping and bale ejecting mechanisms operatively associated with said bale forming means, a belt drive operatively interposed between said shafts including an endless belt and a back and forth adjustable sheave element cooperable with said belt so as to selectively establish a power transmitting connection between said shafts by adjustment of said sheave element in a belt tightening direction, and so as to interrupt said power transmitting connection by adjustment of said sheave element in a belt slackening direction, control means responsive to operation of said bale forming means so as to initiate operation of said twine wrapping mechanism and to adjust said sheave element in said belt slackening direction upon formation of a bale of predetermined diameter, and control means responsive to operation of said bale ejecting mechanism so as to adjust said sheave element in said belt tightening direction.

2. In a baling machine of the type wherein a mat of incoming material is rolled into a cylindrical bale and twine is wrapped around said bale before its ejection from the machine, the combination of material feeding means including a rotary drive shaft, bale forming means including a rotary drive shaft in transversely spaced relation to said drive shaft of said material feeding means, twine wrapping and bale ejecting mechanisms operatively associated with said bale forming means, a driving sheave connected in driven relation with said drive shaft of said bale forming means, a driven sheave connected in driving relation with said drive shaft of said material feeding means and spaced a predetermined center distance from said driving sheave, an endless belt trained about said sheaves and being of a length greater than the minimum length required to operatively engage said belt in power transmitting relation with said sheaves, an idler sheave cooperable with said belt and adjustable transversely of its axis of rotation so as to establish a power transmitting connection between said driving and driven sheaves by adjustment of said idler sheave in a belt tightening direction, and so as to interrupt said power transmitting connection by adjustment of said idler sheave in a belt slackening direction, control means responsive to operation of said bale forming means so as to initiate operation of said twine wrapping mechanism and to adjust said idler sheave in said belt slackening direction upon formation of a bale of predetermined diameter, and control means responsive to operation of said bale ejecting mechanism so as to adjust said idler sheave in said belt tightening direction.

3. In a baling machine of the type wherein a mat of incoming material is rolled into a cylindrical bale and twine is wrapped around said bale before its ejection from the machine, the combination of material feeding means including a rotary drive shaft; bale forming means including a pair of power driven shafts in transversely spaced relation to each other and both spaced from said drive shaft; twine wrapping and bale ejecting mechanisms operatively associated with said bale forming means; a driving sheave secured to one of said power driven shafts for rotation therewith; a driven sheave mounted on the other of said power driven shafts for rotation relative thereto; power transmitting means connecting said driven sheave in driving relation with said drive shaft of said material feeding means; an endless belt trained about said sheaves and being of a length greater than the minimum length required to operatively engage said belt in power transmitting relation with said sheaves; an idler sheave cooperable with said belt and adjustable transversely of its axis of rotation so as to establish a power transmitting connection between said driving and driven sheaves by adjustment of said idler sheave in a belt tightening direction, and so as to interrupt said power transmitting connection by adjustment of said idler sheave in a belt slackening direction; control means responsive to operation of said bale forming means so as to initiate operation of said twine wrapping mechanism and to adjust said idler sheave in said belt slackening direction upon formation of a bale of predetermined diameter; and control means responsive to operation of said bale ejecting mechanism so as to adjust said idler sheave in said belt tightening direction.

4. In a baling machine of the type wherein a mat of incoming material is rolled into a cylindrical bale and twine is wrapped around said bale before its ejection from the machine, the combination of material feeding means including a rotary drive shaft, bale forming means including a rotary drive shaft in transversely spaced relation to said drive shaft of said material feeding means, twine wrapping and bale ejecting mechanisms operatively associated with said bale forming means, a belt drive operatively interposed between said shafts including an endless belt and a back and forth adjustable thrust transmitting element cooperable with said belt so as to selectively establish a power transmitting connection between said shafts by adjustment of said thrust transmitting element in a belt tightening direction, and so as to interrupt said power transmitting connection by adjustment of said thrust transmitting element in a belt slackening direction; back and forth movable control means operatively associated with said wrapping mechanism and with said belt tensioning means so as to initiate operation of said wrapping mechanism and movement of said thrust transmitting element in said belt slackening direction by movement of said control means in one direction; actuating means for said control means responsive to an increase of the diameter of said bale so as to effect said movement of said control means in said one direction after said bale has reached a predetermined diameter; and additional control means for moving said thrust transmitting element of said belt drive in said belt tightening direction upon discharge of said bale from said bale forming mechanism by said ejecting mechanism.

References Cited in the file of this patent

UNITED STATES PATENTS

| | | |
|---|---|---|
| 2,047,362 | Dunford | July 14, 1936 |
| 2,336,491 | Luebben | Dec. 14, 1943 |
| 2,424,821 | Harrer | July 29, 1947 |
| 2,468,641 | Scranton et al. | Apr. 26, 1949 |
| 2,592,008 | Cherek | Apr. 8, 1952 |